(12) United States Patent
Kalla et al.

(10) Patent No.: US 7,013,400 B2
(45) Date of Patent: Mar. 14, 2006

(54) METHOD FOR MANAGING POWER IN A SIMULTANEOUS MULTITHREAD PROCESSOR BY LOADING INSTRUCTIONS INTO PIPELINE CIRCUIT DURING SELECT TIMES BASED ON CLOCK SIGNAL FREQUENCY AND SELECTED POWER MODE

(75) Inventors: Ronald N. Kalla, Round Rock, TX (US); Minh Michelle Q. Pham, Austin, TX (US); John W. Ward, III, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 10/422,674

(22) Filed: Apr. 24, 2003

(65) Prior Publication Data

US 2004/0215984 A1 Oct. 28, 2004

(51) Int. Cl.
*G06F 1/32* (2006.01)
(52) U.S. Cl. ............ 713/320; 713/323; 712/205
(58) Field of Classification Search ............ None
See application file for complete search history.

(56) References Cited

U.S. PATENT DOCUMENTS

| | | | |
|---|---|---|---|
| 5,247,677 A | | 9/1993 | Welland et al. ............. 395/650 |
| 5,892,959 A | * | 4/1999 | Fung ............................ 713/323 |
| 6,073,159 A | * | 6/2000 | Emer et al. ................. 718/103 |
| 6,076,157 A | * | 6/2000 | Borkenhagen et al. ...... 712/228 |
| 6,105,127 A | * | 8/2000 | Kimura et al. .............. 712/215 |
| 6,212,544 B1 | * | 4/2001 | Borkenhagen et al. ...... 718/103 |
| 6,256,775 B1 | * | 7/2001 | Flynn .......................... 717/127 |
| 6,308,279 B1 | * | 10/2001 | Toll et al. ................... 713/323 |
| 6,341,347 B1 | | 1/2002 | Joy et al. .................... 712/228 |
| 6,651,158 B1 | * | 11/2003 | Burns et al. ................ 712/205 |
| 6,658,447 B1 | * | 12/2003 | Cota-Robles ............... 718/103 |
| 6,697,935 B1 | * | 2/2004 | Borkenhagen et al. ...... 712/228 |
| 6,735,707 B1 | * | 5/2004 | Kapil .......................... 713/322 |
| 6,857,064 B1 | * | 2/2005 | Smith et al. ................ 712/244 |
| 6,883,107 B1 | * | 4/2005 | Rodgers et al. ............. 713/601 |
| 6,931,639 B1 | * | 8/2005 | Eickemeyer ................ 718/104 |

(Continued)

OTHER PUBLICATIONS

R. Iris Bahar et al. "Power and Energy Reduction Via Pipeline Balancing," *International Symposium on Computer Architecture*, ISCA, 2001, Goteborg, Sweden, Jun. 30, 2001, pp. 205-216.

*Primary Examiner*—Chun Cao
(74) *Attorney, Agent, or Firm*—Richard F. Frankeny; Winstead Sechrest & Minick P.C.; Casimer K. Salys

(57) ABSTRACT

A register in the control unit of the CPU that is used to keep track of the address of the current or next instruction is called a program counter. In an SMT system having two threads, the CPU has program counters for both threads and means for alternately selecting between program counters to determine which thread supplies an instruction to the instruction fetch unit (IFU). The software for the SMT assigns a priority to threads entering the code stream. Instructions from the threads are read from the instruction queues pseudo-randomly and proportional to their execution priorities in the normal power mode. If both threads have a lowest priority, a low power mode is set generating a gated select time every N clock cycles of a clock when valid instructions are loaded. N may be adjusted to vary the amount of power savings and the gated select time.

20 Claims, 4 Drawing Sheets

U.S. PATENT DOCUMENTS

| | | |
|---|---|---|
| 2002/0083353 A1 | 6/2002 | Orenstein et al. ........... 713/320 |
| 2003/0028816 A1 | 2/2003 | Bacon ........................ 713/500 |
| 2003/0233394 A1 * | 12/2003 | Rudd et al. .................. 709/107 |
| 2004/0073822 A1 * | 4/2004 | Greco et al. ................. 713/320 |

* cited by examiner

METHOD FOR MANAGING POWER IN A SIMULTANEOUS MULTITHREAD PROCESSOR BY LOADING INSTRUCTIONS INTO PIPELINE CIRCUIT DURING SELECT TIMES BASED ON CLOCK SIGNAL FREQUENCY AND SELECTED POWER MODE

TECHNICAL FIELD

The present invention relates in general to methods and circuitry for a processor having simultaneous multithreading (SMT) and single thread operation modes.

BACKGROUND INFORMATION

For a long time, the secret to more performance was to execute more instructions per cycle, otherwise known as Instruction Level Parallelism (ILP), or decreasing the latency of instructions. To execute more instructions each cycle, more functional units (e.g., integer, floating point, load/store units, etc.) have to be added. In order to more consistently execute multiple instructions, a processing paradigm called out-of-order processing (OOP) may be used, and in fact, this type of processing has become mainstream.

OOP arose because many instructions are dependent upon the outcome of other instructions, which have already been sent into the processing pipeline. To help alleviate this problem, a larger number of instructions are stored in order to allow immediate execution. The reason this is done is to find more instructions that are not dependent upon each other. The area of storage used to store the instructions that are ready to execute immediately is called the reorder buffer. The size of reorder buffers have been growing in most modern commercial computer architectures with some systems able to store as many as 126 instructions. The reason for increasing the size of the reorder buffer is simple: code that is spatially related tends also to be temporally related in terms of execution (with the possible exclusion of arrays of complex structures and linked lists). The only problem is that these instructions also have a tendency to depend upon the outcome of prior instructions. With a CPU's ever increasing amount of required code, the only current way to find more independent instructions has been to increase the size of the reorder buffer.

However, using this technique has achieved a rather impressive downturn in the rate of increased performance and in fact has been showing diminishing returns. It is now taking more and more transistors to achieve the same rate of performance increase. Instead of focusing intently upon uniprocessor ILP extraction, one can focus upon a coarser form of extracting performance at the instruction or thread level, via multithreading (multiprocessing), but without the system bus as a major constraint.

The ability to put more transistors on a single chip has allowed on-chip multiprocessing (CMP). To take advantage of the potential performance increases, the architecture cannot use these multiple processors as uniprocessors but rather must use multiprocessing that relies on executing instructions in a parallel manner. This requires the programs executed on the CMP to also be written to execute in a parallel manner rather than in a purely serial or sequential manner. Assuming that the application is written to execute in a parallel manner (multithreaded), there are inherent difficulties in making the program written in this fashion execute faster proportional to the number of added processors.

The general concept behind using multiple cores on one die is to extract more performance by executing two threads at once. By doing so, the two CPUs together are able to keep a higher percentage of the aggregate number of functional units doing useful work at all times. If a processor has more functional units, then a lower percentage of those units may be doing useful work at any one time. The on-chip multiprocessor lowers the number of functional units per processor, and distributes separate tasks (or threads) to each processor. In this way, it is able to achieve a higher throughput on both tasks combined. A comparative uniprocessor would be able to get through one thread, or task, faster than a CMP chip could, because, although there are wasted functional units, there are also "bursts" of activity produced when the processor computes multiple pieces of data at the same time and uses all available functional units. One idea behind multiprocessors is to keep the individual processors from experiencing such burst activity times and instead have each processor use what resources it has available more frequently and therefore efficiently. The non-use of some of the functional units during a clock cycle is known as "horizontal waste," which CMP tries to avoid.

However, there are problems with CMP. The traditional CMP chip sacrifices single-thread performance in order to expedite the completion of two or more threads. In this way, a CMP chip is comparatively less flexible for general use, because if there is only one thread, an entire half of the allotted resources are idle and completely useless (just as adding another processor in a system that uses a singly threaded program is useless in a traditional multiprocessor (MP) system). One approach to making the functional units in a CMP more efficient is to use course-grained multi-threading (CMT). CMT improves the efficiency with respect to the usage of the functional units by executing one thread for a certain number of clock cycles. The efficiency is improved due to a decrease in "vertical waste." Vertical waste describes situations in which none of the functional units are working due to one thread stalling.

When switching to another thread, the processor saves the state of that thread (i.e., it saves where instructions are in the pipeline, which units are being used) and switches to another one. It does so by using multiple register sets. The advantage of this is due to the fact that often a thread can only go for so long before it falls upon a cache miss, or runs out of independent instructions to execute. A CMT processor can only execute as many different threads in this way as it has support for. So, it can only store as many threads as there are physical locations for each of these threads to store the state of their execution. An N-way CMT processor would therefore need to have the ability to store the state of N threads.

A variation on this concept would be to execute one thread until it has experienced a cache miss (usually a L2 (secondary) cache miss), at which point the system would switch to another thread. This has the advantage of simplifying the logic needed to rotate the threads through a processor, as it will simply switch to another thread as soon as the prior thread is stalled. The penalty of waiting for a requested block to be transferred back into the cache is then alleviated. This is similar to the hit under miss (or hit under multiple miss) caching scheme used by some processors, but it differs because it operates on threads instead of upon instructions. The advantages of CMT over CMP are CMT does not sacrifice single-thread performance, and there is less hardware duplication (less hardware that is halved to make the two processors "equal" to a comparable CMT).

A more aggressive approach to multithreading is called fine-grained multithreading (FMT). Like CMT, the basis of FMT is to switch rapidly between threads. Unlike CMT, however, the idea is to switch each and every cycle. While both CMT and FMT actually do indeed slow down the completion of one thread, FMT expedites the completion of all the threads being worked on, and it is overall throughput which generally matters most.

CMPs may remove some horizontal waste in and unto themselves. CMT and FMT may remove some (or all) vertical waste. However an architecture that comprises an advanced form of multithreading, referred to as Simultaneous Multithreading (SMT), may be used to reduce both horizontal and vertical waste. The major goal of SMT is to have the ability to run instructions from different threads at any given time and in any given functional unit. By rotating through threads, an SMT architecture acts like an FMT processor, and by executing instructions from different threads at the same time, it acts like CMP. Because of this, it allows architects to design wider cores without the worry of diminishing returns. It is reasonable for SMT to achieve higher efficiency than FMT due to its ability to share "unused" functional units among differing threads; in this way, SMT achieves the efficiency of a CMP machine. However, unlike a CMP system, an SMT system makes little to no sacrifice (the small sacrifice is discussed later) for single threaded performance. The reason for this is simple. Whereas much of a CMP processor remains idle when running a single thread and the more processors on the CMP chip makes this problem more pronounced, an SMT processor can dedicate all functional units to the single thread. While this is obviously not as valuable as being able to run multiple threads, the ability to balance between single thread and multithreaded environments is a very useful feature. This means that an SMT processor may exploit thread-level parallelism (TLP) if it is present, and if not, will give full attention to instruction level parallelism (ILP).

In order to support multiple threads, an SMT processor requires more registers than the traditional superscalar processor. The general aim is to provide as many registers for each supported thread as there would be for a uniprocessor. For a traditional reduced instruction set computer (RISC) chip, this implies 32 times N registers (where N is the number of threads an SMT processor could handle in one cycle), plus whatever renaming registers are required. For a 4-way SMT processor RISC processor, this would mean 128 registers, plus however many renaming registers are needed.

Most SMT models are straightforward extensions of a conventional out-of-order processor. With an increase in the actual throughput comes more demands upon instruction issue width, which should be increased accordingly. Because of the aforementioned increase in the register file size, an SMT pipeline length may be increased by two stages (one to select register bank and one to do a read or write) so as not to slow down the length of the clock cycle. The register read and register write stages are therefore both broken up into two pipelined stages.

In order to not allow any one thread to dominate the pipeline, an effort should be made to ensure that the other threads get a realistic slice of the execution time and resources. When the functional units are requesting work to do, the fetch mechanism will provide a higher priority to those threads that have the fewest instructions already in the pipeline. Of course, if the other threads have little they can do, more instructions from the thread are already dominating the pipelines.

SMT is about sharing whatever possible. However, in some instances, this disrupts the traditional organization of data, as well as instruction flow. The branch prediction unit becomes less effective when shared, because it has to keep track of more threads with more instructions and will therefore be less efficient at giving an accurate prediction. This means that the pipeline will need to be flushed more often due to miss prediction, but the ability to run multiple threads more than makes up for this deficit.

The penalty for a misprediction is greater due to the longer pipeline used by an SMT architecture (by two stages), which is in turn due to the rather large register file required. However, techniques have been developed to minimize the number of registers needed per thread in an SMT architecture. This is done by more efficient operating system (OS) and hardware support for better deallocation of registers, and the ability to share registers from another thread context if another thread is not using all of them.

Another issue is the number of threads in relation to the size of caches, the line sizes of caches, and the bandwidth afforded by them. As is the case for single-threaded programs, increasing the cache-line size decreases the miss rate but also increases the miss penalty. Having support for more threads which use more differing data exacerbates this problem and thus less of the cache is effectively useful for each thread. This contention for the cache is even more pronounced when dealing with a multiprogrammed workload over a multithreaded workload. Thus, if more threads are in use, then the caches should be larger. This also applies to CMP processors with shared L2 caches.

The more threads that are in use results in a higher overall performance and the differences in association of memory data become more readily apparent. There is an indication that when the L1 (primary) cache size is kept constant, the highest level of performance is achieved using a more associative cache, despite longer access times. Tests have been conducted to determine performance with varying block sizes that differ associatively while varying the numbers of threads. As before, increasing the associative level of blocks increased the performance at all times; however, increasing the block size decreased performance if more than two threads were in use. This was so much so that the increase in the degree of association of blocks could not make up for the deficit caused by the greater miss penalty of the larger block size.

If a thread enters the code stream that is not critical to system performance, it should be assigned the lowest possible priority by the software. This practice may be used to conserve power since the hardware performance would not be a concern. In a high-performance SMT processor, power consumption is always a concern. There is, therefore, a need for a method that conserves power based on the execution priority of instructions in the multiple threads.

SUMMARY OF THE INVENTION

In an SMT system with two threads, thread priority logic implements a low power mode when both threads have the lowest priority. A variable counter counts a read clock used to read instructions from instruction queues (IQs) for each thread in the IDU. Normally, instructions are selected from each thread and read from the IQs pseudo randomly proportional to each thread's program controlled priority and at a rate determined by the read clock. In the low power mode, a selected number of the most significant bits (MSBs) of the variable counter are combined in logic to determine when all of the bits are a logic 1 (in the same desired state). This condition occurs once every N clock cycles where N is determined by the number of selected MSBs. When all of the MSBs are a logic 1, an instruction from the first thread is selected and read from the IFU. On the next following clock cycle, an instruction from the second thread is read from the IQs. During the time when all the MSBs are not a logic 1, the reads from the IQs are disabled and instructions are not forwarded to the instruction decode and instruction sequencer and downstream logic does not have valid instructions to process, thus saving power. As soon as both threads cease to be at the same lowest priority and low power is canceled, instruction reads from the IQs and loading of the instruction decoder reverts to the normal mode; instructions are selected from each thread and read from the instruction queues pseudo randomly proportional to each thread's program controlled priority and at a rate determined by the read clock.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
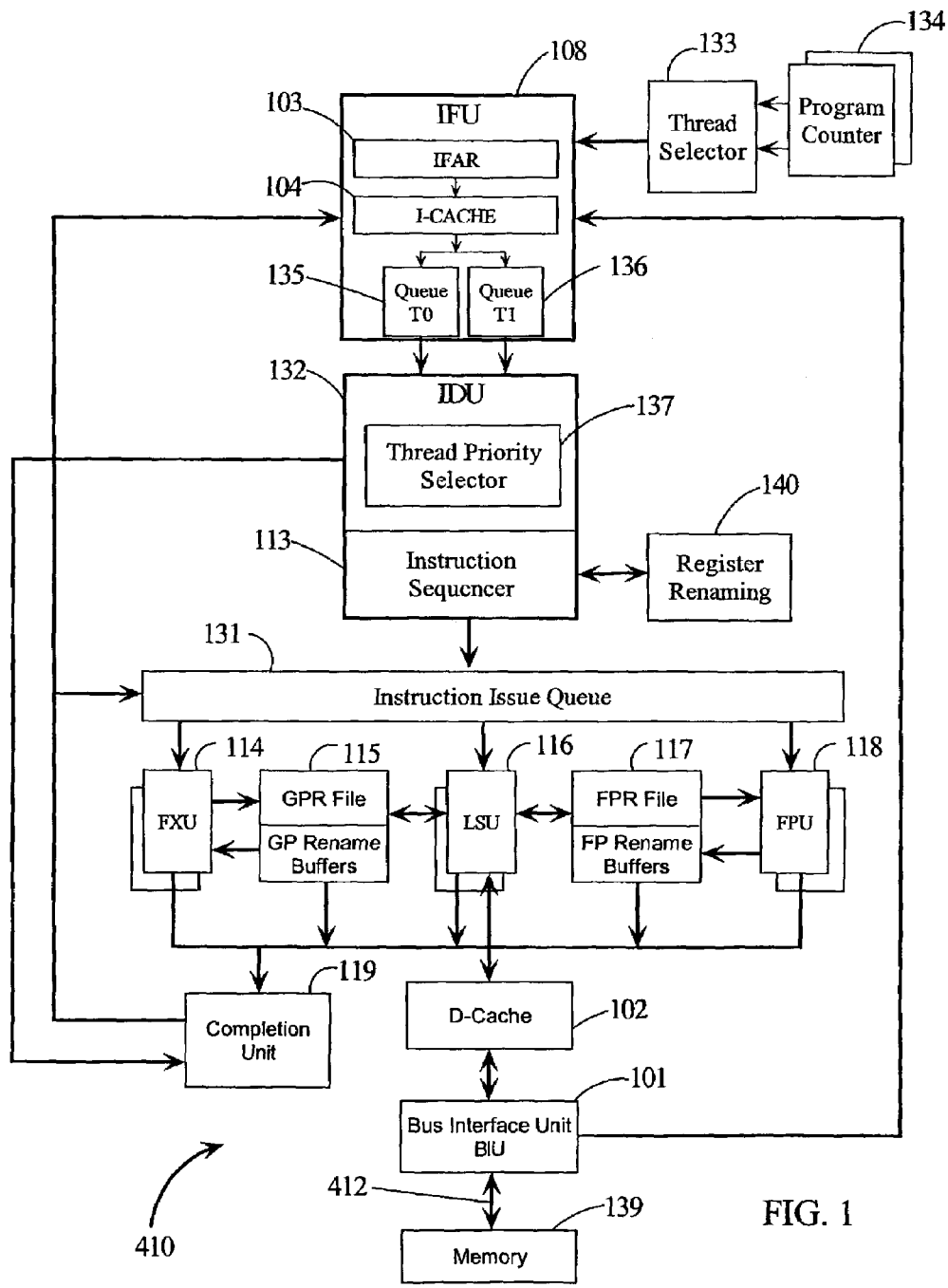
FIG. 1 is a block diagram of functional units in an SMT processor according to embodiments of the present invention.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing, data formats within communication protocols, and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there are illustrated details of CPU 410. CPU 410 is designed to execute multiple instructions per clock cycle. Thus, multiple instructions may be executing in any of the execution units, fixed point units (FXUs) 114, floating point units (FPUs) 118, and load/store units (LSUs) 116 during any one clock cycle. Likewise, CPU 410 may simultaneously execute instructions from multiple threads in an SMT mode.

Program counters (PCs) 134 correspond to thread zero (T0) and thread one (T1) that have instructions for execution. Thread selector 133 alternately selects between T0 and T1 to couple an instruction address to instruction fetch unit (IFU) 108. Instruction addresses are loaded into instruction fetch address register (IFAR) 103. IFAR 103 alternately fetches instructions for each thread from instruction cache (I-Cache) 104. Instructions are buffered in instruction queue (IQ) 135 for T0 and IQ 136 for T1. IQ 135 and IQ 136 are coupled to instruction dispatch unit (IDU) 132. Instructions are selected and read from IQ 135 and IQ 136 under control of thread priority selector 137. Normally, thread priority selector 137 reads instructions from IQ 135 and IQ 136 substantially proportional to each thread's program controlled priority.

The instructions are decoded in a decoder (not shown) in IDU 132. Instruction sequencer 113 then may place the instructions in groups in an order determined by various algorithms. The groups of instructions are forwarded to instruction issue queue (IIQ) 131. The instruction sequencer 113 receives instructions from both threads in program order, but the instructions may be issued from the IIQ 131 out of program order and from either thread. The general purpose register (GPR) file 115 and floating point register (FPR) file 117 are used by multiple executing units and represent the program state of the system. These hardware registers may be referred to as the "architected" registers. When an instruction is put into an issue queue, each architected register is renamed. Each architected register that is being modified is assigned a physical register and a corresponding look-up table identifies physical registers that are associated with an architected register. Therefore in the issue queue, the architected register has been renamed so that multiple copies of an architected register may exist at the same time. This allows instructions to be executed out-of-order as long as source operands are available. Register renaming unit 140, renames and maps the registers so that unused physical registers may be reassigned when all instructions referencing a particular physical register complete and the physical register does not contain the latest architected state.

Instructions are queued in IIQ 131 for execution in the appropriate execution unit. If an instruction contains a fixed point operation, then any of the multiple fixed point units (FXUs) 114 may be used. All of the execution units, FXU 114, FPU 118 and LSU 116 are coupled to completion unit 119 that has completion tables (not shown) indicating which of the issued instructions have completed and other status information. Information from completion unit 119 is forwarded to IFU 108. IDU 132 may also send information to completion unit 119. Data from a store operation from LSU 116 is coupled to data cache (D-Cache) 102. This data may be stored in D-Cache 102 for near term use and/or forwarded to bus interface unit (BIU) 101 which sends the data over bus 412 to memory 139. LSU 116 may load data from D-Cache 102 for use by the execution units (e.g., FXU 114).

Figure 2:
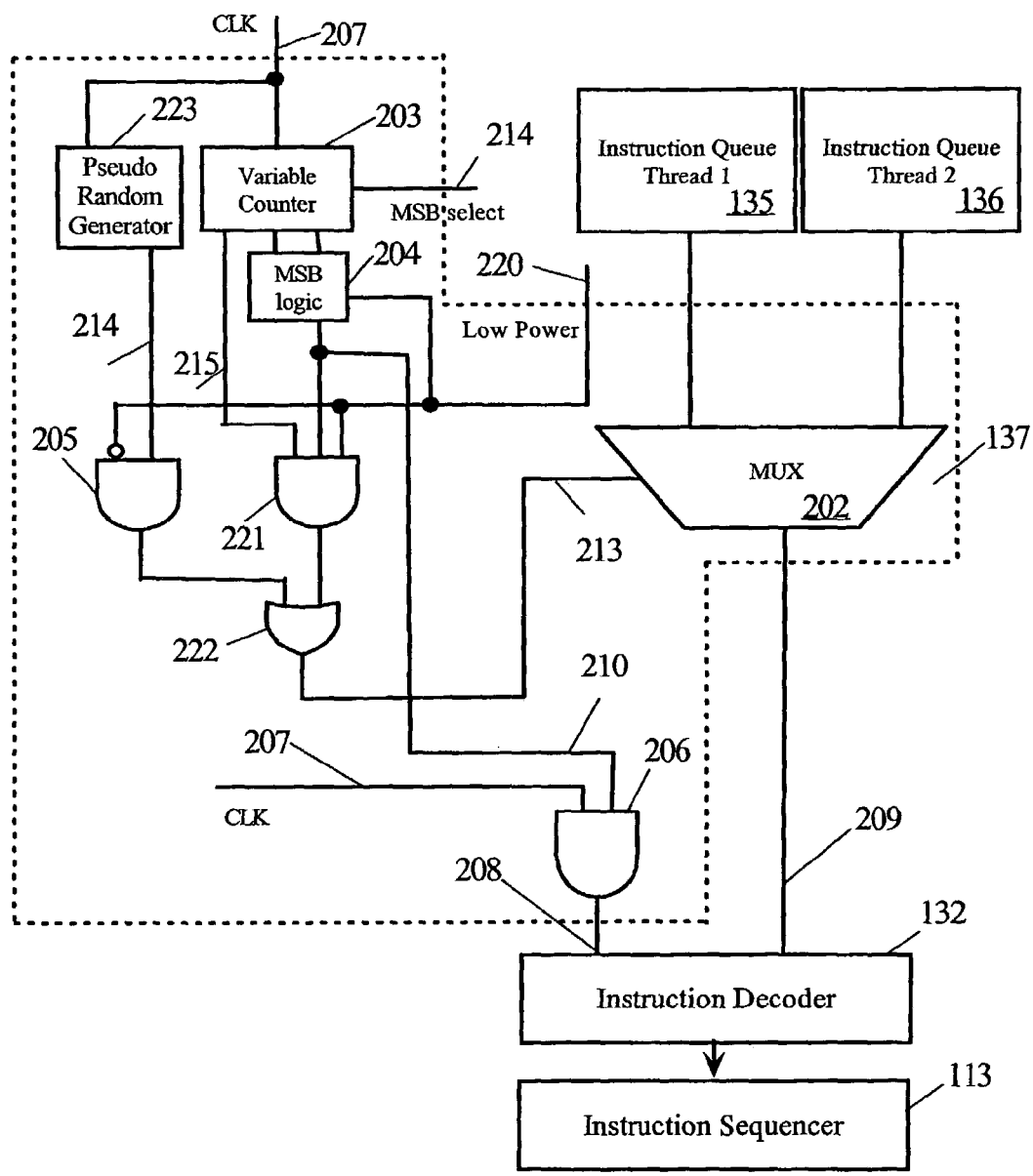
FIG. 2 is a block diagram of circuitry for implementing embodiments of the present invention.

FIG. 2 is a block diagram of functional units in embodiments of the present invention. Instructions from each thread are queued in IQ 135 and IQ 136 and are shown as part of IFU 108 only for illustration. IQ 135 and IQ 136 may be considered as part of IDU 132. Thread selector 137 comprises multiplexer (MUX) 202, variable counter 203, pseudo random generator (PRG) 223, AND gates 205, 206, and 221, OR gate 222, and most significant bit (MSB) logic 204.

MUX 202 alternately selects between instructions from IQ 135 and IQ 136 in response to logic states of output 213. When output 213 is a logic 1, IQ 135 is selected and when output 213 is a logic 0, IQ 136 is selected. Low power signal 220 is used to select between two methods of switching MUX 202. During normal operation, PRG 223 loads instructions from IQ 134 and IQ 135 substantially in proportion to their respective program controlled priorities. If both threads are at a same lowest priority, low power signal 220 may be set to a logic 1 disabling AND gate 205. A logic 1 on low power signal 220 enables AND gate 221 allowing the output 210 of MSB logic 204 and LSB 215 to control output 213 via OR gate 222. When low power signal 220 is a logic 0 (normal power mode), gates output 210 of MSB logic 204 to be at a logic 1 so that AND gate 206 is always enabled allowing clock signal CLK 207 to pass to output 208.

When low power signal 220 is a logic 1 and both threads are in the lowest priority, the low power mode may be further controlled. The degree of low power is controlled using MSB select signal 214 to variable counter 203. MSB logic 204 selects which MSBs of counter 203 are logic combined to form output 210. Output 210 of MSB logic 204 is a logic 1 when all its inputs are all at a logic 1 and a logic 0 at other times. If counter 203 has a maximum count of N, then by selecting the proper MSBs output 210 will be a logic 1 every N cycles of CLK 207.

For example, assume variable counter 203 is configured as a 4-bit counter (maximum count of 16) and the three upper MSBs are coupled to MSB logic 204. The three MSBs are all a logic 1, enabling AND gate 221, during clock cycle 15 and 16 of CLK 207. Likewise, least significant bit (LSB) 215 is a logic 0 for clock cycle 15 and a logic 1 for clock cycle 16. Output 213 then selects IQ 135 during clock cycle 15 and IQ 136 during clock 16. Output 210 enables AND gate 206 during clock cycles 15 and 16 and one clock pulse loads a thread merging stage in instruction decoder 132 with an instruction from IQ 135 during clock cycle 15 and one instruction from IQ 136 during clock cycle 16. When AND gate 206 is disabled, instruction decoder 132 does not receive load pulses and instructions from the IQs are effectively "held." By varying the stages of variable counter 203, instructions from IQ 135 and IQ 136 may be forwarded to instruction sequencer 113 and IIQ 131 at a reduced rate thereby slowing instruction execution in later stages and saving power.

In another embodiment of the present invention, signals 213 and 208 may be used to gate OFF valid bits of instructions that are "held" during the low power mode. The instructions may proceed down the pipeline but since they are tagged as "invalid," they will not be processed thus saving power. Likewise, the pipeline stages may gate OFF their own clock signals in response to the instructions with OFF valid bits received during the low power mode.

Figure 3:
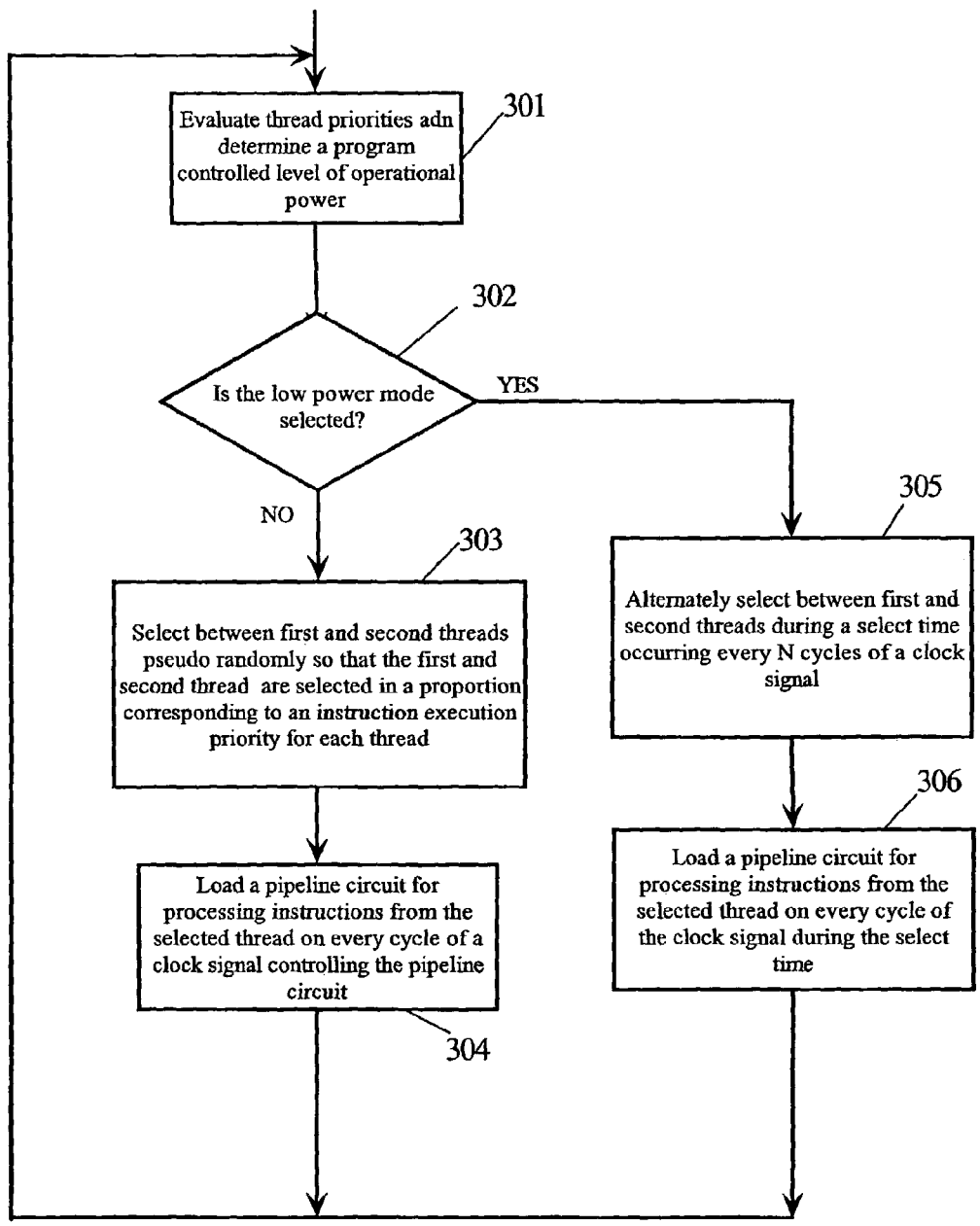
FIG. 3 is a flow diagram of method steps according to embodiments of the present invention.

FIG. 3 is a flow diagram of method steps in embodiments of the present invention. In step 301, a programmed controlled level of operational power is set in an SMT processor considering thread priorities and by selecting a clock divider number N. In step 302, a test is done to determine if the selected mode is a low power mode. If the low power mode is not selected, then in step 303 selected instructions are generated for the first and second threads pseudo-randomly so that the first and second thread instructions in the selected instructions are substantially in a proportion corresponding to an instruction execution priority for each thread. In step 304, a pipeline circuit for processing instructions is loaded with selected instructions on every cycle of a clock cycle controlling the pipeline circuit. A return is then taken back to step 302 to determine if the power mode has changed.

If the result of the test in step 302 is YES, then a normal power mode is selected. In step 305, instructions from the first and second threads are alternately selected so that equal first and second thread instructions are selected during a select time occurring once every N cycles of a clock signal controlling a pipeline circuit for processing the first and second thread instructions. In step 306, the pipeline circuit is loaded with selected instructions on every cycle of the clock signal. A return is then taken back to step 302 to determine if the power mode has changed.

Figure 4:
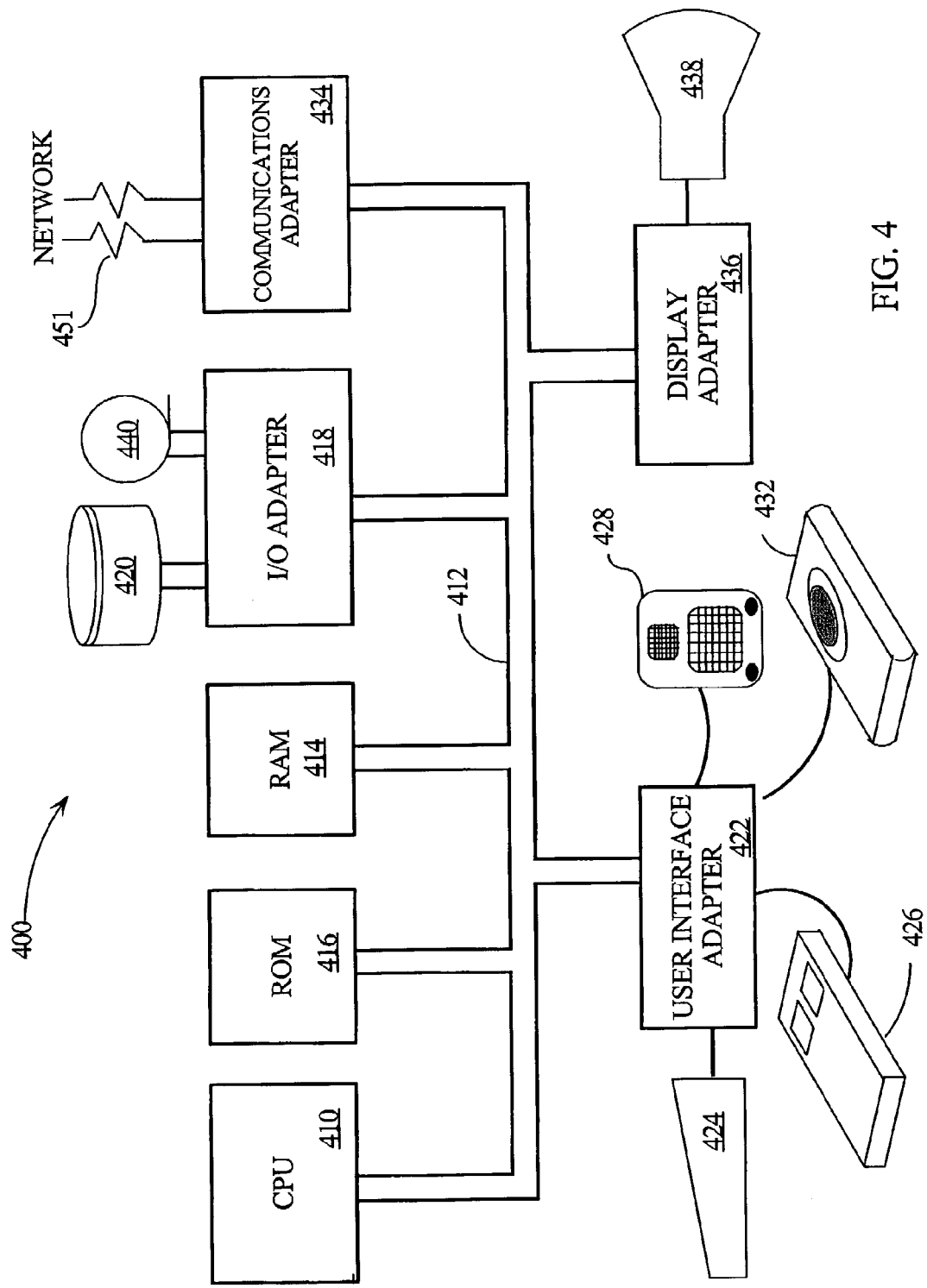
FIG. 4 is a representative hardware environment for practicing the present invention.

A representative hardware environment for practicing the present invention is depicted in FIG. 4, which illustrates a typical hardware configuration of a workstation in accordance with the subject invention having central processing unit (CPU) 410 with simultaneous multithread (SMT) processing and a number of other units interconnected via system bus 412. The workstation shown in FIG. 4 includes random access memory (RAM) 414, read only memory (ROM) 416, and input/output (I/O) adapter 418 for connecting peripheral devices such as disk units 420 and tape drives 440 to bus 412, user interface adapter 422 for connecting keyboard 424, mouse 426, speaker 428, microphone 432, and/or other user interface devices such as a touch screen device (not shown) to bus 412, communication adapter 434 for connecting the workstation to a data processing network, and display adapter 436 for connecting bus 412 to display device 438.

Although the present invention and its advantages have been described in detail, it should be understood that various changes, substitutions and alterations can be made herein without departing from the spirit and scope of the invention as defined by the appended claims.

What is claimed is:

1. A method of managing power in a simultaneous multithread (SMT) processor having a pipeline circuit for processing instructions from first and second threads comprising:
    determining an instruction execution priority for each of said first and second threads and setting a selected power mode;
    selecting said first thread for a first select time and said second thread for a second select time in response to said a selected power mode and a clock signal; and
    loading instructions into said pipeline circuit during said first and second select times in response to a frequency of said clock signal.

2. The method of claim 1, wherein said selected power mode is a low power mode is set when said first and second threads have a same lowest instruction execution priority.

3. The method of claim 2, wherein said first and second select times result in first and second thread instructions being executed proportional to their corresponding instruction execution priority when said selected power mode is a normal power mode.

4. The method of claim 3, wherein said first and second select times form a pseudo random distribution between said first and second threads during said normal power mode.

5. The method of claim 2, wherein said first and second select time alternate during a gated time period set to occur every N cycles of said clock signal during said low power mode, wherein said instructions from a selected thread are loaded at each cycle of said clock signal during said gated time period and said instructions are held at all other times outside said gated time period.

6. The method of claim 5, wherein instructions are held by setting a corresponding instruction valid bits to an OFF state generating a held instruction, wherein pipeline stages, receiving said held instruction with an OFF state valid bit, gate OFF a corresponding pipeline clock signal to save power.

7. The method of claim 5, wherein instructions are held and not loaded into a next pipeline stage at each cycle of said clock signal to save power.

8. A simultaneous multithread (SMT) processor comprising:
   a pipeline circuit for processing instructions from first and second threads;
   circuitry for determining an instruction execution priority for each of said first and second threads and setting a selected power mode;
   circuitry for selecting said first thread for a first select time and said second thread for a second select time in response to said a selected power mode and a clock signal; and
   circuitry for loading instructions into said pipeline circuit during said first and second select times in response to a frequency of said clock signal.

9. The processor of claim 8, wherein said selected power mode is a low power mode set when said first and second threads have a same lowest instruction execution priority.

10. The processor of claim 9, wherein said first and second select times result in first and second thread instructions being executed proportional to their corresponding instruction execution priority when said selected power mode is a normal power mode.

11. The processor of claim 10, wherein said first and second select times form a pseudo random distribution between said first and second threads during said normal power mode.

12. The processor of claim 9, wherein said first and second select time alternate during a gated time period set to occur every N cycles of said clock signal during said low power mode, wherein said instructions from a selected thread are loaded at each cycle of said clock signal during said gated time period and said instructions are held at all other times outside said gated time period.

13. The processor of claim 12, wherein instructions are held by setting corresponding instruction valid bits to an OFF state generating a held instruction, wherein pipeline stages, receiving said held instruction with an OFF state valid bit, gate OFF a corresponding pipeline clock signal to save power.

14. The processor of claim 12, wherein instructions are held and not loaded into a next pipeline stage at each cycle of said clock signal to save power.

15. A data processing system comprising:
   a central processing unit (CPU) having one or more simultaneous multithread (SMT) processors;
   a random access memory (RAM);
   an input output (I/O) adapter;
   a communications adapter;
   a bus coupling said CPU, RAM, I/O adapter, and said communications adapter;
   a pipeline circuit in said SMT processor for processing instructions from first and second threads;
   circuitry for determining an instruction execution priority for each of said first and second threads and setting a selected power mode;
   circuitry for selecting said first thread for a first select time and said second thread for a second select time in response to said a selected power mode and a clock signal; and
   circuitry for loading instructions into said pipeline circuit during said first and second select times in response to a frequency of said clock signal.

16. The data processing system of claim 15, wherein said selected power mode is a low power mode set when said first and second threads have a same lowest instruction execution priority.

17. The data processing system of claim 16, wherein said first and second select times result in first and second thread instructions being executed proportional to their corresponding instruction execution priority when said selected power mode is a normal power mode.

18. The data processing system of claim 17, wherein said first and second select times form a pseudo random distribution between said first and second threads during said normal power mode.

19. The data processing system of claim 16, wherein said first and second select time alternate during a gated time period set to occur every N cycles of said clock signal during said low power mode, wherein said instructions from a selected thread are loaded at each cycle of said clock signal during said gated time period and said instructions are held at all other times outside said gated time period.

20. The data processing system of claim 19, wherein instructions are held by setting corresponding instruction valid bits to an OFF state generating a held instruction, wherein pipeline stages, receiving said held instruction with an OFF state valid bit, gate OFF a corresponding pipeline clock signal to save power.

* * * * *